United States Patent
Hirabayashi et al.

(10) Patent No.: US 6,269,415 B1
(45) Date of Patent: Jul. 31, 2001

(54) METHOD FOR TRANSFERRING DATA OVER AN ADDRESS BUS

(75) Inventors: Akira Hirabayashi; Tamaki Ura, both of Kanazawa (JP)

(73) Assignee: I-O Data Device, Inc., Ishikawa (JP)

( * ) Notice: Subject to any disclaimer, the term of this patent is extended or adjusted under 35 U.S.C. 154(b) by 0 days.

(21) Appl. No.: 09/230,597

(22) PCT Filed: Oct. 22, 1997

(86) PCT No.: PCT/JP97/03838

§ 371 Date: Jan. 26, 1999

§ 102(e) Date: Jan. 26, 1999

(87) PCT Pub. No.: WO98/19245

PCT Pub. Date: May 7, 1998

(30) Foreign Application Priority Data

Oct. 28, 1996 (JP) ............................................... 8-285288

(51) Int. Cl.[7] ................................................. G06F 13/00
(52) U.S. Cl. ........................ 710/102; 710/101; 710/103; 710/126; 710/129
(58) Field of Search .................... 710/100–103, 710/113–118, 126–132

(56) References Cited

FOREIGN PATENT DOCUMENTS

| 58-169226 | 10/1983 | (JP) | G06F/3/00 |
|---|---|---|---|
| 61-84655 | 8/1986 | (JP) | G06F/13/36 |
| 6459448 | 3/1989 | (JP) | G06F/13/38 |
| 2012358 | 1/1990 | (JP) | G06F/13/38 |
| 2230454 | 9/1990 | (JP) | G06F/13/38 |
| 3137755 | 6/1991 | (JP) | G06F/13/36 |
| 7334456 | 12/1995 | (JP) | G06F/13/38 |

*Primary Examiner*—Rupal Dharia
(74) *Attorney, Agent, or Firm*—Pillsbury Winthrop LLP

(57) ABSTRACT

The invention provides a data transfer method useful for data transfer with PC cards or other external equipment connected to a personal computer. First in a memory-to-memory data transfer mode, a part of data to be transferred is used as address data and the rest of the data to be transferred is stored at memory addresses specified by the address data. Next, in a block transfer mode, the data is transferred to a PC card or other external equipment. In this process, because transfer-source address data, i.e. part of the data to be transferred, is put on the address bus in the block transfer mode, the data is transferred with both address bus and data bus.

8 Claims, 7 Drawing Sheets

METHOD FOR TRANSFERRING DATA OVER AN ADDRESS BUS

BACKGROUND OF THE INVENTION

1. Field of the Invention

The present invention relates to a data transfer method for transferring data with address buses, a data transfer program storage medium in which this data transfer method is stored, and information processing equipment, a card-shaped medium and an external storage medium to be used in the data transfer method.

2. Description of the Prior Art

Recently, to expand the possibility of information processing equipment such as personal computers, PC cards have been proposed. The PC card is a card-shaped medium, and when used, it is inserted in an exclusive slot provided in a personal computer. A PC card, when inserted into the slot, is connected to the personal computer via a data bus and an address bus. PC cards are available in various kinds such as those which function as a storage medium and those which act as an interface with equipment connected to external. The user is allowed to make use of the function of an inserted PC card in a personal computer only by changing the PC card to be inserted into the slot. Thus, it has been becoming possible to expand and change the functions of personal computers simply and readily.

However, currently common PC cards are to be connected to personal computers with a 16-bit long data bus, being capable of transferring only 16-bit data at a maximum in 1-cycle data transfer. As a result of this, there has been an issue that long time would be taken from start to end of data transfer when the volume of the data to be transferred is as large as 64 Kbyte or so.

Meanwhile, in some personal computers, larger capacity of memory space that can be specified with the address bus is allocated relative to the actually installed memory capacity. In such equipment, it is seldom the case that the whole address bus is used, and there exist, in most cases, address bus bit lines that are not used but idling. With attention given to this fact, there have been proposed methods for transferring data by using these idling address bus bit lines (Japanese Patent Laid-Open Publications SHO 56-143049, SHO 61-184655, SHO 62-254050 and HEI 2-23045).

However, since these methods use the idling address bus bit lines for data transfer, the amount of data which can be transferred using the address bus varies depending on the number of bits (free capacity of the address bus), as a problem. Moreover, there has been another problem that the data transfer method could not be executed if no idling address bus bit lines are present (when the address bus has no free capacity).

An object of the present invention is to provide a data transfer method which, in data transfer, allows part of the data to be transferred anytime by using the address bus, thus having accomplished a reduction in time required for data transfer.

Another object of the present invention is to provide a data transfer program storage medium in which programs for executing the above data transfer method are stored, and information processing equipment serving as a transfer source, as well as a card-shaped medium and an external storage medium serving as transfer destinations when this data transfer method is executed.

SUMMARY OF THE INVENTION

The present invention provides a data transfer method comprising:

a first step for, setting a part of transfer data to be transferred as address data and writing the rest of the transfer data to a memory area specified by the address data in a memory-to-memory data transfer mode; and a second step for transferring the data of the memory area to a transfer destination in a block transfer mode.

The present invention also provides a data transfer program storage medium which has stored a program including the first step and the second step.

The present invention further provides information processing equipment to which the data transfer method is applied, wherein length of data which is carried on a data bus is longer than length of data which is carried on an address bus in the block transfer mode.

The present invention further provides a card-shaped medium which comprises means for insertion into a slot provided in information processing equipment, and which serves as the transfer destination in the data transfer method.

The present invention further provides the card-shaped medium, wherein length of data which is carried on a data bus is longer than length of data which is carried on an address bus.

The present invention further provides external equipment comprising: an address bus terminal, a data bus terminal, and a multiplexer for selectively fetching data on the address bus inputted at the address bus terminal or data on the data bus inputted at the data bus terminal during the block transfer mode, and outputting the selected data onto an internal data bus.

The present invention further provides the external equipment, wherein each of the address bus terminal and the data bus terminal comprises a terminal which can be inserted into a slot provided in the information processing equipment, and wherein the external equipment has a card shape as a whole.

The memory-to-memory transfer mode herein refers to a mode which comprises a cycle during which a CPU of a transfer side equipment outputs an address where transfer-source data has been stored, onto an address bus and the data stored at the address is read by an data bus, and a cycle during which the transfer-destination address is outputted to the address bus and the read transfer-source data is outputted to the data bus so that the transfer-source data is transferred.

Also, the block transfer mode herein refers to a mode which comprises a cycle during which the CPU of the transfer side equipment first sets a leading address in a transfer destination where data to be transferred to the transfer destination as well as an amount of data to be transferred, a cycle during which an address where the transfer-source data has been stored is outputted onto the address bus, and the data stored at the address is read to the data bus, and a cycle during which a transfer-destination addresses successively incremented are outputted to the address bus and the read data is outputted to the data bus so that the data is transferred.

In the block transfer mode, a leading address where the data to be transferred to the transfer destination should be stored as well as the amount of the data to be transferred are set in the first step. Therefore, in the subsequent cycle of actually transferring data, the successively incremented addresses on the address bus are not used as address information of the transfer destination. Thus, in the data transfer method of the present invention, an address is specified by a part of the transfer data, and the rest of the transfer data is written into a memory area specified by the address data. This process is executed in the memory-to-memory transfer mode. Then, the data of the address specified by a part of the transfer data is transferred in the block transfer mode. Accordingly, when data is transferred in the block transfer mode, a part of the transfer data is transferred by the address bus.

DETAILED DESCRIPTION OF THE PREFERRED EMBODIMENTS

Figure 1:
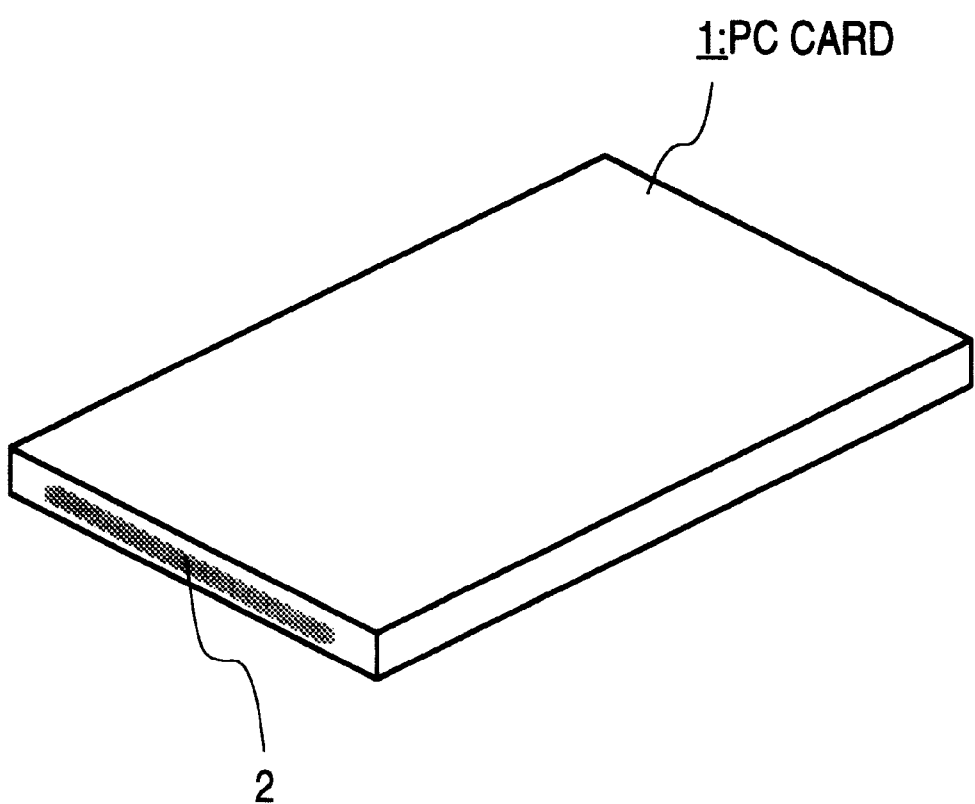
FIG. 1 is a view showing the appearance of a PC card.

FIG. 1 is a view showing the appearance of a PC card which is a card type medium. In the fore of the PC card 1 is provided a connector 2 for connection with a personal computer. The PC card inserted into an exclusive slot provided in the personal computer is connected to the personal computer via a data bus, an address bus and a control bus. In some PC cards 1, another connector is provided in the rear. For instance, in a PC card 1 having a modem function, a connector for connection with the telephone line is provided in the rear. Connecting external equipment to this connector allows the connected external equipment to be utilized by the personal computer.

In addition, a common PC card 1 according to the PCMCIA2.1/JEIDA Ver. 4.2 standard complies with specifications that the PC card is connected to the personal computer with a 16-bit data bus and a 26-bit address bus.

Figure 2:
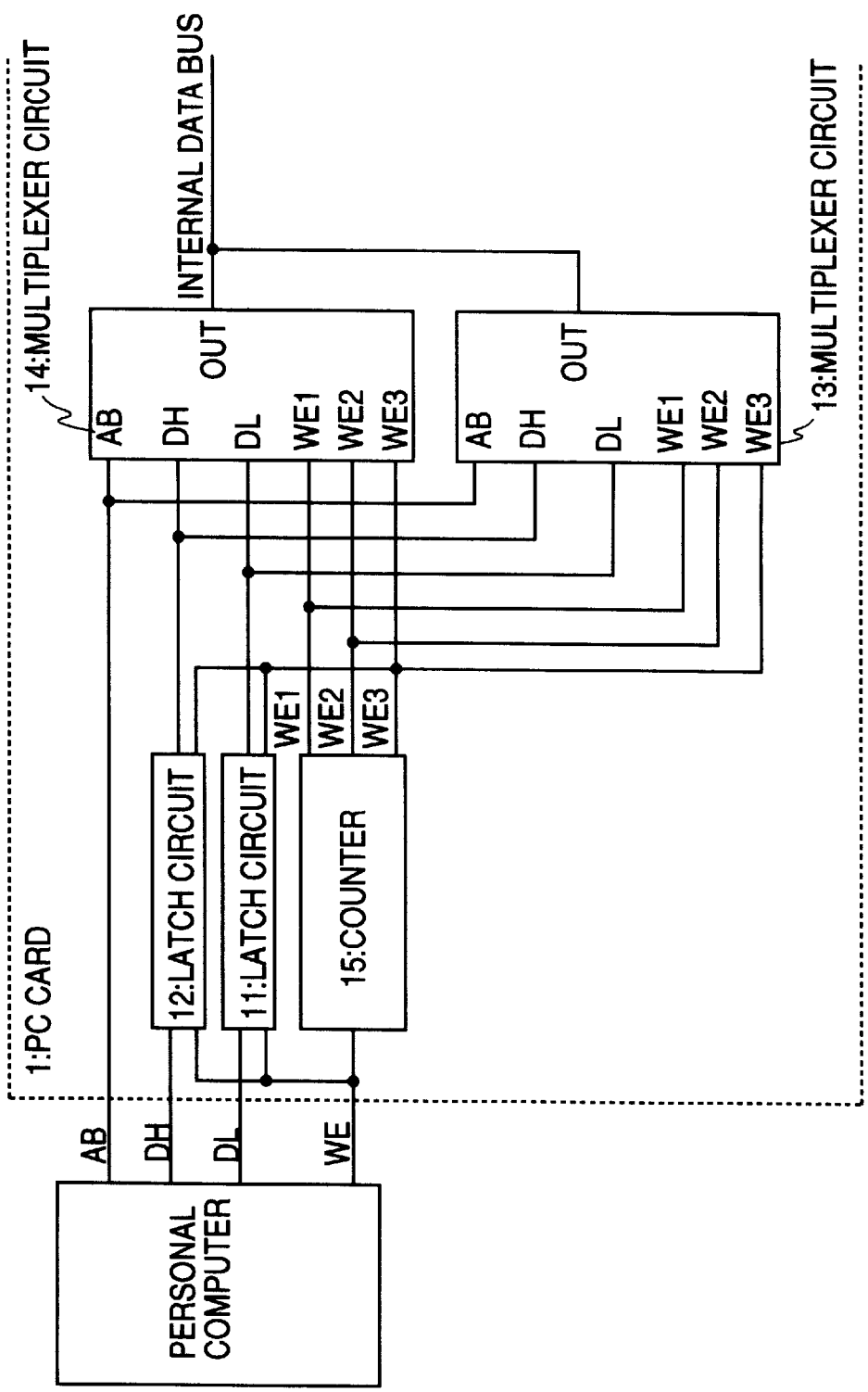
FIG. 2 is a block diagram showing the constitution of an interface part of a PC card.

FIG. 2 is a block diagram showing an interface part of the PC card connected to the personal computer. The personal computer and the PC card 1 are connected to each other via an address bus (AB), data buses (DH, DL) and a control bus. The address bus shown in the figure is to be used for later-described data transfer, while the other address buses are not shown. In this embodiment, the address bus illustrated is assumed to have 8 bits. Also, the data buses denoted by DH, DL are 8-bit data buses, and the PC card 1 and the personal computer are connected to each other via 16-bit data buses. Only write enable signals (WE) are shown in the figure as connection by the control bus (the other control signals are not shown).

In the figure, reference numerals 11, 12 denote data latch circuits, 13, 14 denote multiplexer circuits, and 15 denotes a counter. The latch circuit 11 latches 8-bit data transferred by the data bus (DL), while the latch circuit 12 latches 8-bit data transferred by the data bus (DH). To the multiplexer circuits 13, 14, 8-bit data transferred by the address bus as well as 8-bit data outputted from the data latch circuits 11, 12 are inputted and then, from among these, one is selectively outputted to an internal data bus. Data of lower-order 8 bits is outputted from the multiplexer circuit 13, while data of higher-order 8 bits is outputted from the multiplexer circuit 14. Details of this will be described later. It is noted that the multiplexer circuits 13, 14 select data to be outputted to the internal data bus, according to signals WE1, WE2, WE3 inputted from the counter 15. The counter 15 counts write enable (WE) signals, which are the control signals transmitted from the personal computer side, and outputs the WE1, WE2 and WE3 according to the resulting count value.

The method for transferring data from the personal computer to the PC card is now described in detail. The personal computer first sets an amount of data to be transferred and a leading address to which the transferred data is to be written. The data amount is set, for example, to 64 Kbyte. Here is discussed a method for transferring to the PC card 1 totally 3-word, 48-bit data consisting of data (1H/1L), (2H/2L), (3H/3L) where each 1 word is assumed to be 16 bits. In addition, by iterating the process of transferring these 48-bit (6-byte) data, the large capacity of data set to 64 Kbyte or so is transferred. Also, nH, nL (n=1, 2, 3) are each 8-bit data.

Figure 3:
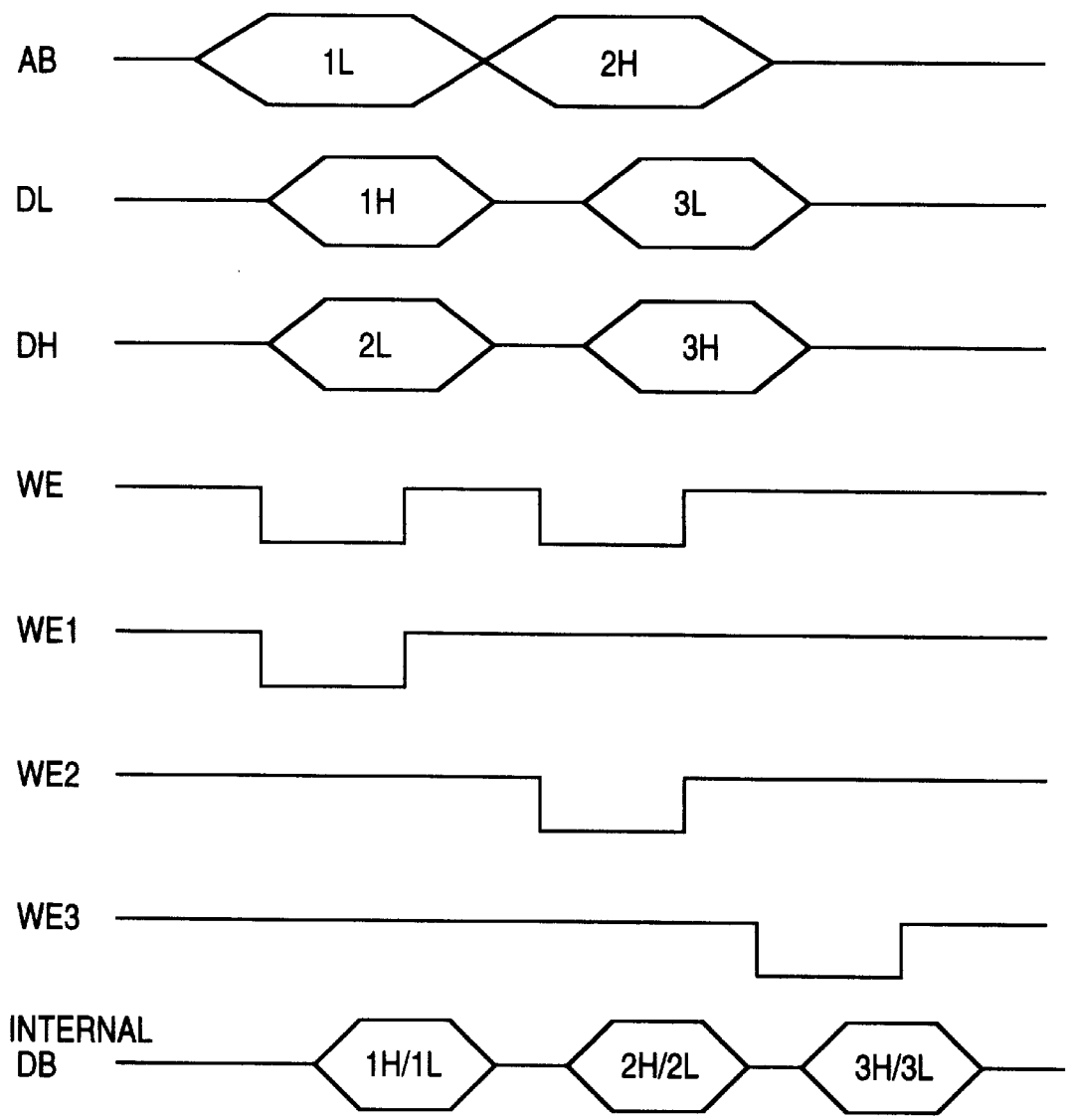
FIG. 3 is a time chart for the processing of data transfer.
Figure 4:
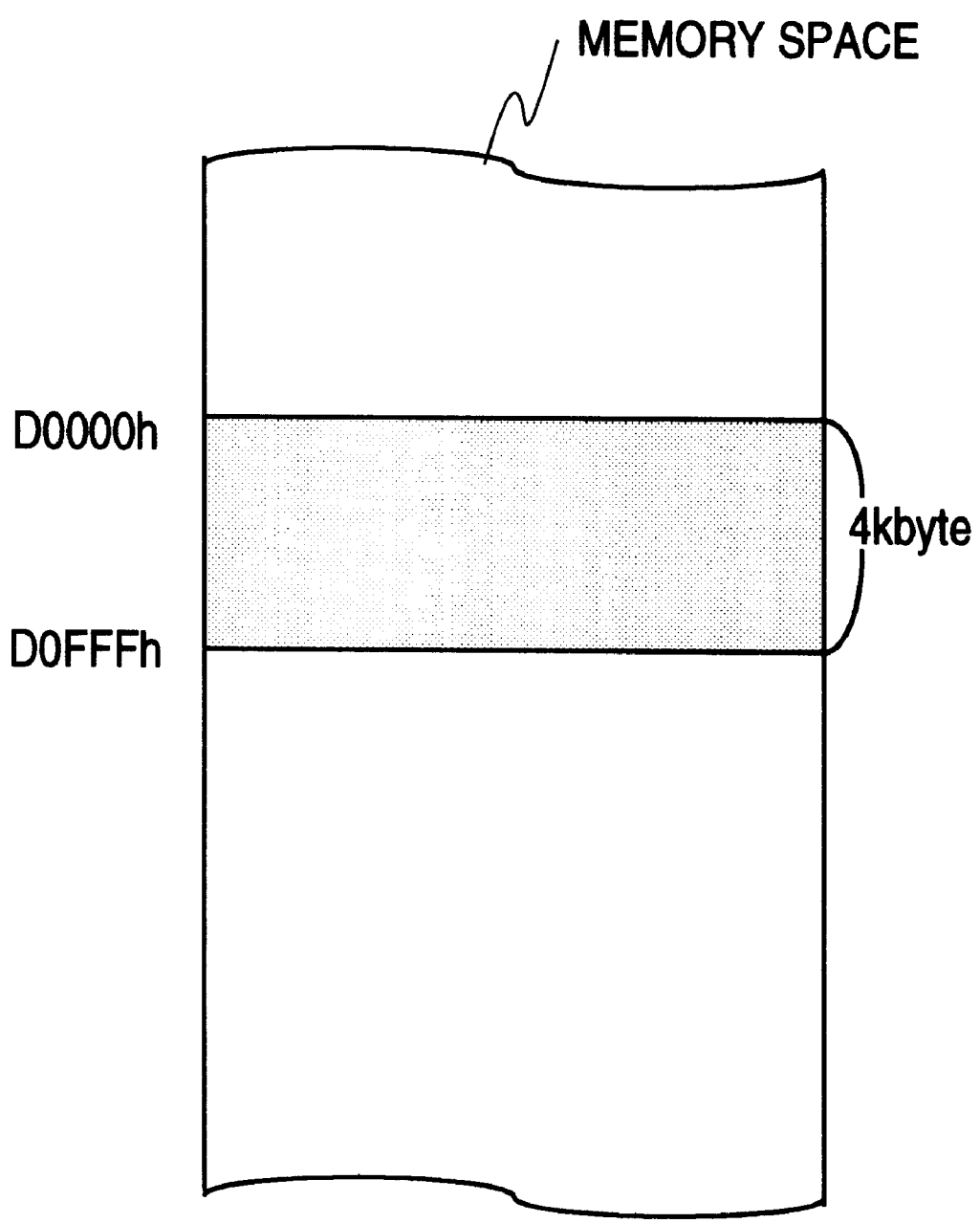
FIG. 4 is a view showing an allocated memory space.

FIG. 3 is a timing chart for this transfer process. In the personal computer, programs for executing the later-described transfer process have been written. These programs are provided via storage media such as floppy disks. In the personal computer, a consecutive 4 Kbyte memory space is allocated to the PC card prior to the data transfer. In this connection, whereas a 512 byte memory space is actually used in this embodiment, the specifications for common personal computers using 8086-series (x86-series) CPUs made by Intel Corp. prescribe a minimum of 4 Kbyte for the allocation of memory space to external equipment or the like. As shown in FIG. 4, it is assumed that the memory space is allocated as a consecutive 4 Kbyte memory space shown by addresses D0000h–D0FFFh. The personal computer maps 24-bit data (1L, 1H, 2L) to be first transferred onto the aforementioned reserved 4 Kbyte memory space. The mapping herein referred to is executed by memory-to-memory transfer so called in the present invention.

The personal computer (actually, CPU) selects one address in this 4 Kbyte memory space by using 8-bit data denoted by 1L. For the address selection, when the data 1L is 8-bit data represented as (a1, a2, a3, a4, a5, a6, a7, a8) (where al is the most significant bit), 9-bit data consisting of these 8-bit data plus 1 bit is prepared. The bit to be added here has a value of 0 and is added as the least significant bit. Therefore, the prepared 9-bit data is (a1, a2, a3, a4, a5, a6, a7, a8, 0). The personal computer selects an address having the lowest-order three digits of its notational address in the hexadecimal address notation coincident with these 9 bits from the reserved memory space. For example, if data 1L is (1, 1, 1, 1, 1, 1, 1, 1), then 9-bit data (1, 1, 1, 1, 1, 1, 1, 1, 0) is prepared. Since this 9-bit data results in a hexadecimal notation of 1FE, the personal computer specifies D01FEh as the transfer destination address. The term, 'specifies", means putting the D01FEh onto the address bus as a transfer destination address. Also, data 1H and 2L are outputted to the data bus as the data to be transferred. By this process, data 1H is written into the specified address, and data 2L is written into the succeeding address (D01FFh, when D01FEh is selected). Thus, the mapping of 24-bit data to be transferred is completed.

Now that the mapping of 24-bit data to be transferred is completed by the above process, the personal computer transfers the mapped data to the PC card. For this transfer, the block transfer mode is used. In this transfer mode, when the mapped data of the memory area is transferred, data on the address bus is never used as address data because of the characteristic of the block transfer mode. On the other hand, by the above mapping technique, 1L of the transfer data is used as address data of the mapping area. Therefore, when data transfer is executed in the block transfer mode, data 1L is transferred as the address data, in which case this data 1L becomes obtainable from the address bus at the transfer destination. This obtained data from the address bus is a part of the data to be transferred. More specifically, on the assumption that eight bus lines on which 8 bits of the second to ninth lowest-order bits of the address are carried are taken as an address bus AB, the personal computer uses the address bus AB to output the data (1L) and outputs the data (1H) to the data bus DL and outputs to the data bus DH the 8-bit data (2L) that has been written into the succeeding address. In this way, as shown in FIG. 3, data output of AB=1L, DH=1H and DL=2L is accomplished.

In addition, according to the specifications of a personal computer using a 8086-series (×86-series) CPU, in connection to a PC card with a 16-bit data bus, when 8-bit data stored in consecutive address "n" and address "n+1", respectively, are transferred, totally 16-bit data stored in the two addresses are transferred in 1-cycle transfer process by making full use of the 16-bit data bus (where information showing the address "n" is transferred by the address bus), provided that the "n" is an even number. On the other hand, given that the "n" is an odd number, the 8-bit data stored in the address "n" is transferred without fully using the 16-bit data bus, and after this, the 8-bit data stored in the address "n+1" is transferred. That is, if the n is an odd number, a 2-cycle transfer process is executed. Thus, in this embodiment, 1 bit having a value of 0 is added as the least significant bit in specifically determining the address so that the specifically determined address is inhibited from becoming an odd number, and that data is securely transferred by making full use of the 16-bit data bus.

Prior to the transfer of data, the personal computer inputs a WE signal to the PC card 1 by the control bus. The WE signal is a negative-logic signal that is normally High and switched to Low for data transfer. The PC card 1 recognizes that data is just to be transferred from the personal computer, by the WE signal falling from High to Low. This WE signal is inputted to the data latch circuits 11, 12 and the counter 15. At this time point, the count value of the counter 15 is 0. When the first (first-issued) WE signal is inputted, the counter 15 increments the count value to 1 while inputting the WE1 to the multiplexer circuits 13, 14. This WE1 signal is normally kept High, switched to Low when the count value becomes 1, and again switched to High after a specified time elapse. The multiplexer circuit 13 to which the WE1 has been inputted selects the data (1L) transferred by the address bus AB, and outputs this to the internal data bus.

Also, the multiplexer circuit 14 to which the WE1 has been inputted selects the data (1H) inputted from the data latch circuit 11, and outputs this to the internal data bus. As a result, 16-bit data (1H/1L) in which the highest-order 8 bits are 1H and the lowest-order 8 bits are 1L has been outputted to the internal data bus. The PC card 1 fetches and processes the 16-bit data of (1H/1L) outputted to the internal data bus. In addition, because there is a slight time lag from when the WE signal is inputted from the personal computer until when the data is actually transferred up by the data bus, there is also a slight time lag from when the WE signal falls until when the 16-bit data (1H/1L) is outputted to the internal data bus.

The data latch to the latch circuits 11, 12 is performed in the following manner.

The personal computer, a specified elapse after making the WE signal Low, switches this signal from Low to High. The data latch circuits 11, 12 latch input data at the timing of the rise from Low to High of the WE signal.

Therefore, the 8-bit data 1H is latched to the latch circuit 11, while the 8-bit data 2L is latched to the latch circuit 12. In this way, after the data 1H and 2L are latched, respectively, the data (1H/1L) is outputted as described above. Subsequently, the personal computer maps the remaining 24-bit data (2H, 3L, 3H) that have not been transferred, into the memory space reserved by the foregoing process. In this process, as in the process for the data 1L, the data 2H is used as addressing data in the mapping. Over the mapping, like the foregoing case, the personal computer switches the WE signal from High to Low prior to the transfer of data. Then, the personal computer transfers the data (2H) by the address bus AB, the data (3L) by the data bus DL, and the data (3H) by the data bus DH.

In the PC card 1, when the WE signal is switched to Low, the counter 15 increments the count value to 2, while outputting a WE2 signal. This WE2 signal, like the foregoing WE1 signal, is normally kept High and, when the count value becomes 2, switched to Low, and again switched to High after a specified time elapse. The multiplexer circuit 13 to which the WE2 has been inputted selects the data inputted from the data latch circuit 12, and outputs this to the internal data bus. At this time point, the data latch circuit 12 is outputting the data 2L latched at the preceding rise of the WE signal as described above.

Also, the multiplexer circuit 14 to which the WE2 has been inputted selects the data 2H that has been transferred by the address bus AB, and outputs this to the internal data bus. As a result, 16-bit data (2H/2L) in which the highest-order 8 bits are 2H and the lowest-order 8 bits are 2L is outputted to the internal data bus. The PC card 1 fetches and processes the 16-bit data (2H/2L) outputted to the internal data bus.

After that, as in the foregoing case, when the WE signal is switched from Low to High by the personal computer, the data latch circuits 11, 12 latch input data at the timing of rise from Low to High of the WE signal. Therefore, the latch circuit 11 latches the 8-bit data 3L and the latch circuit 12 latches the 8-bit data 3H.

The counter 15 outputs a WE3 signal a specified time elapse after the WE2 is switched from Low to High. The multiplexer circuit 13, to which the WE3 has been inputted, selects data inputted from the data latch circuit 11, and outputs this to the internal data bus. The data latch circuit 11 is outputting the data 3L latched at the preceding rise of the WE signal as described above. Also, the multiplexer circuit 14, to which the WE3 has been inputted, selects data inputted from the data latch circuit 12, and outputs this to the internal data bus. The data latch circuit 12 is outputting the data 3H latched at the preceding rise of the WE signal as described above. As a result, 16-bit data (3H/3L) in which the highest-order 8 bits are 3H and the lowest-order 8 bits are 3L is outputted to the internal data bus. The PC card 1 fetches and processes the 16-bit data of (3H/3L) outputted to the internal data bus. Further, the WE3 signal is inputted also to the data latch circuits 11, 12. Like the WE1 and WE2 signals, the WE3 is again switched to High a specified time elapse after switched to Low. The counter 15 resets the count value to 0 when switching the WE3 to High. Also, the data latch circuits 11, 12 release the data latch at the rise of the WE3 signal. Thus, the transfer of 48-bit data has been completed. The aforementioned mapping and following processes are iterated, by which the transfer of large-volume data is processed.

As shown above, in this embodiment, only by reserving a memory space as small as 4 Kbyte, 24-bit data can be transferred at all times by 1-cycle transfer process so that the time required for data transfer can be reduced. Further, it is also possible to transfer 1-word data in divisions between the address bus AB and the data buses DL and DH (between 1L, 1H and 2L, 2H). In addition, this transfer method was able to obtain a data transfer rate 1.5 times higher than the transfer rate of the prior art in which only the data buses DL and DH are used as buses for data transfer.

Figure 5:
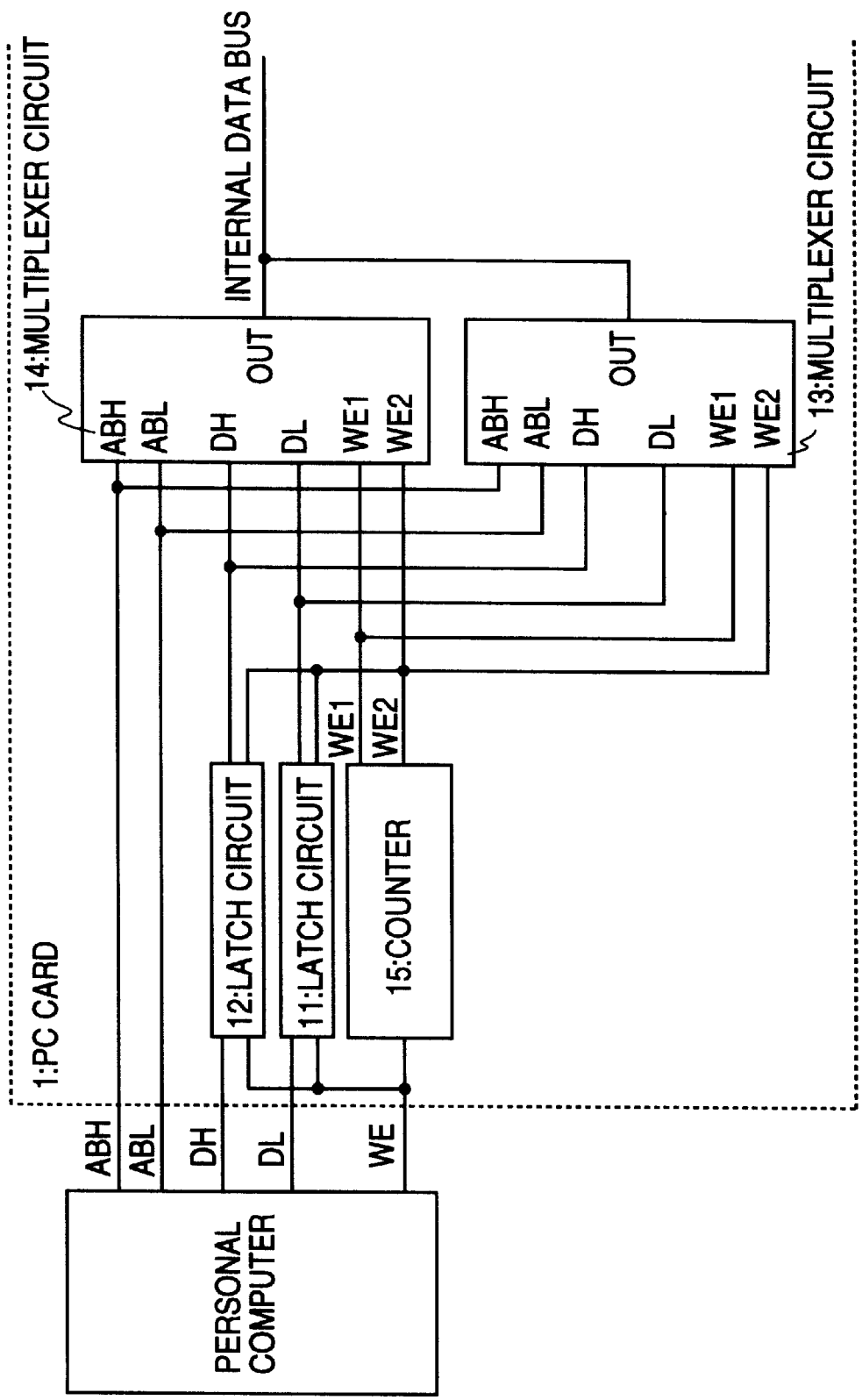
FIG. 5 is a block diagram showing the constitution of an interface part of another PC card.

Next, another embodiment of the present invention is explained. In this embodiment, unlike the foregoing embodiment, the address bus used for data transfer has 16 bits. FIG. 5 shows a block diagram of an interface part of the PC card 1 according to this embodiment. The personal computer and the PC card 1 are connected to each other via address buses (ABH, ABL), data buses (DH, DL) and a control bus. The address buses (ABH, ABL) shown in the figure each have 8 bits, and are used for later-described data transfer, where the other address buses are not shown. Also, the data buses denoted by DH, DL are 8-bit data buses, respectively, as in the foregoing embodiment, where it is shown that the PC card 1 and the personal computer are connected to each other via a 16-bit data bus. The connection by the control bus is also shown by write enable signals (WE) only as in the foregoing embodiment.

In the figure, reference numerals 11, 12 denote data latch circuits, 13, 14 denote multiplexer circuits, and 15 denotes a counter. The latch circuit 11 latches 8-bit data transferred by the data bus (DL), while the latch circuit 12 latches 8-bit data transferred by the data bus (DH). To the multiplexer circuits 13, 14, 8-bit data transferred by the address bus ABH or address bus ABL as well as 8-bit data outputted from the data latch circuits 11, 12 are inputted and then, from among these, one is selectively outputted to an internal data bus. The multiplexer circuit 13 outputs lower-order 8-bit data, while the multiplexer circuit 14 outputs higher-order 8-bit data. It is noted that the multiplexer circuits 13, 14 select data to be outputted to the internal data bus, according to signals WE1, WE2 inputted from the counter 15.

The counter 15 counts write enable (WE) signals, which are the control signals transmitted from the personal computer side, and outputs the WE1 and WE2 according to the resulting count value.

Figure 6:
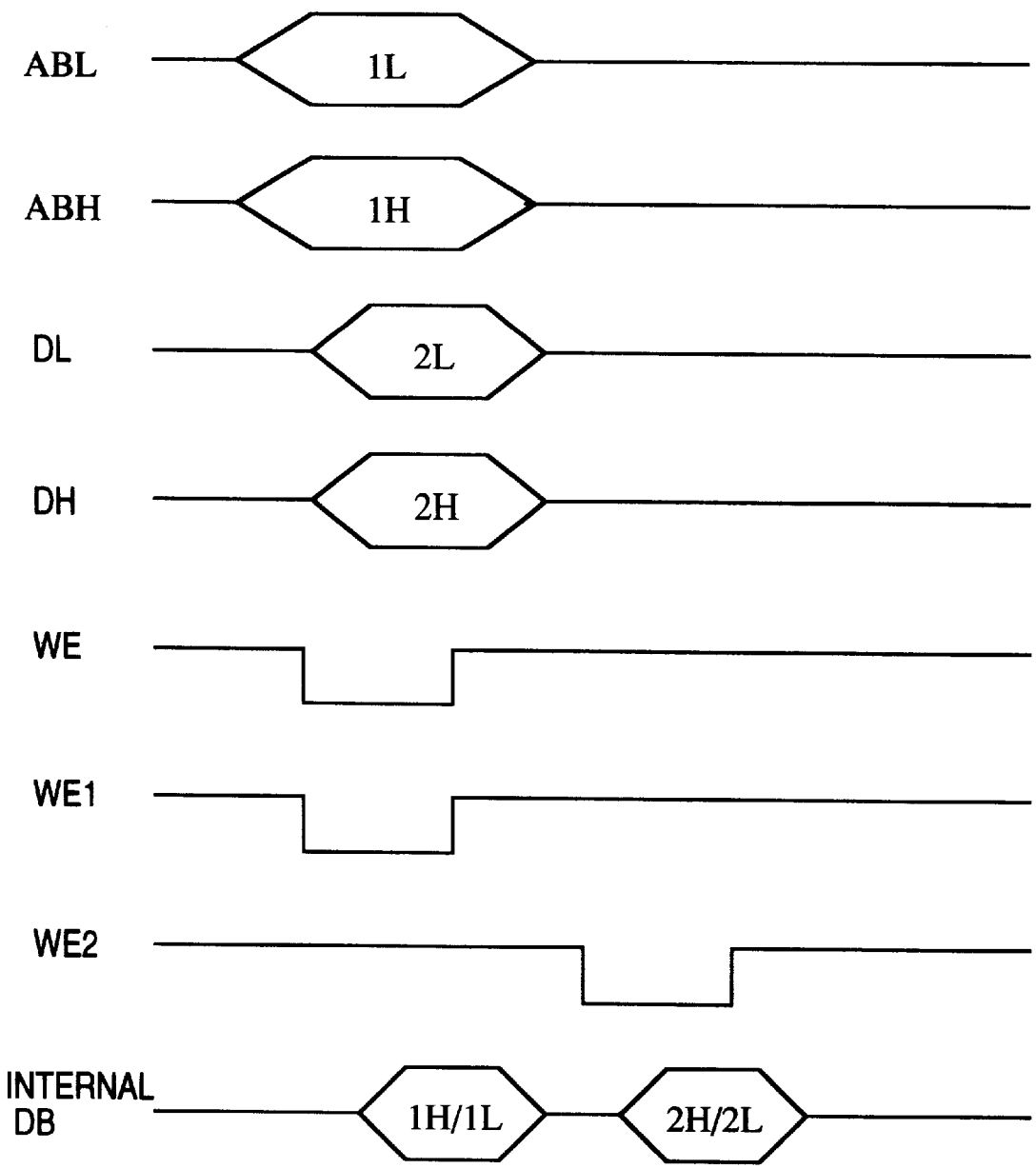
FIG. 6 is a time chart for the processing of data transfer.

FIG. 6 is a timing chart for this transfer process. In order to use the 16-bit address bus for data transfer, the personal computer reserves a consecutive 128 Kbyte memory space. The personal computer first sets an amount of data to be transferred and a leading address to which the transferred data is to be written. The data amount is set, for example, to 64 Kbyte or so.

Figure 7:
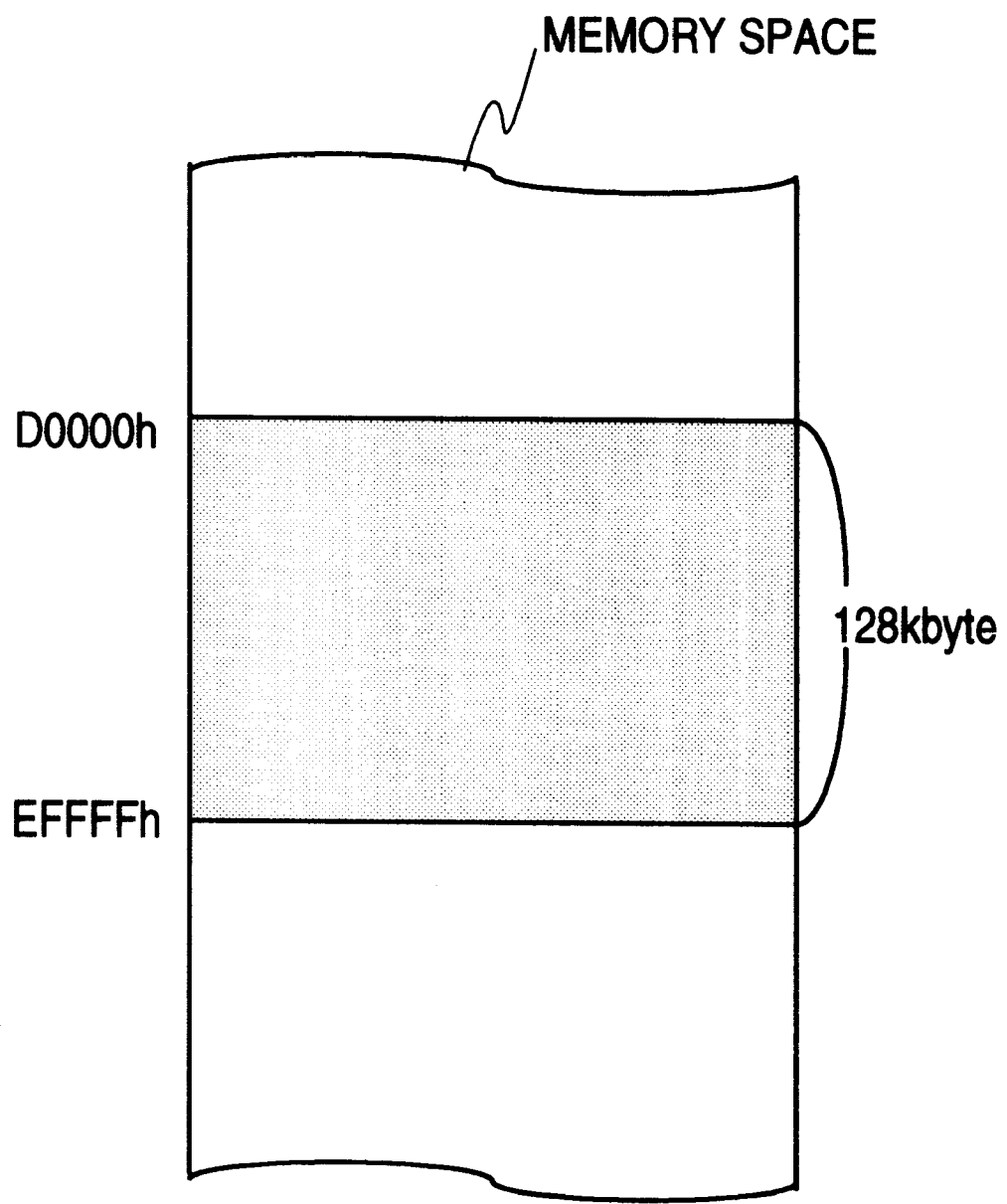
FIG. 7 is a view showing an allocated memory space.

In this embodiment, 32-bit data is transferred at a time in 1 cycle. Prior to data transfer, the personal computer maps totally 32-bit data to be transferred, onto the reserved 128 Kbyte memory space by using the memory-to-memory data transfer mode. In this embodiment, addressing is performed with 16-bit data denoted by (1H/1L). As shown in FIG. 7, it is assumed that the consecutive 128 Kbyte memory space with addresses denoted by D0000h–EFFFFh has been reserved. When the data 1L is 8-bit data shown by (a1, a2, a3, a4, a5, a6, a7, a8) and the data 1L is 8-bit data shown by (b1, b2, b3, b4, b5, b6, b7, b8) (where al, b1 are the most significant bits), 17-bit data consisting of the 16-bit data shown by (a1, a2, a3, a4, a5, a6, a7, a8, b1, b2, b3, b4, b5, b6, b7, b8) plus 1 bit is prepared. The bit to be added here, like the foregoing embodiment, has a value of 0 and is added as the least significant bit.

The prepared 17-bit data is shown by (a1, a2, a3, a4, a5, a6, a7, a8, b1, b2, b3, b4, b5, b6, b7, b8, 0). In the reserved memory space, if a1 is 0, then an address in which its notational address in the hexadecimal address notation has E at the most significant digit and the lowest-order 4 digits coincident with the value shown by the lowest-order 16 bits of the 17 bits is selected, and if a1 is 1, then an address in which the most significant digit is D and the lowest-order 4 digits are coincident with the value shown by the lowest-order 16 bits of the 17 bits is assigned. For example, if both data 1H and 1L are 8-bit data shown by (1, 1, 1, 1, 1, 1, 1, 1), then an address of DFFFEh is specified. Also, the data of 2L is written into the address here specified, and the data of 2H is written into the succeeding address, by the memory-to-memory data transfer mode. Thus, the mapping of 32-bit data to be transferred is completed.

Now that the mapping of 32-bit data to be transferred is completed by the above process, the personal computer transfers the mapped data to the PC card in the block transfer mode. In this process, the data 1L, 1H used in the specification of address are outputted to the 8-bit address buses ABL, ABH by the above mapping technique.

More specifically, on the assumption that eight bus lines on which 8 bits of the second to ninth lowest-order bits of the address are carried are taken as the address bus ABL, and that eight bus lines on which 8 bits of the tenth to seventeenth lowest-order bits are carried are taken as the address bus ABH, the personal computer transfers the data 1L, 1H with these address buses ABL, ABH. Besides, the personal computer puts the data (2L) onto the data bus DL, and puts onto the data bus DH the 8-bit data (2H) that has been written into the succeeding address, thus transferring the data to the PC card.

Prior to the transfer of data, the personal computer inputs a WE signal to the PC card 1 by the control bus. The WE signal is a negative-logic signal that is normally High and switched to Low for data transfer. The PC card 1 recognizes that data is just to be transferred from the personal computer, by the WE signal falling from High to Low. At this time point, the count value of the counter 15 is 0. When the WE signal is inputted, the counter 15 increments the count value to 1 while inputting the WE1 to the multiplexer circuits 13, 14. This WE1 signal is normally kept High, switched to Low when the count value becomes 1, and again switched to High after a specified time elapse, as in the foregoing embodiment. The multiplexer circuit 13 to which the WE1 has been inputted selects the data 1L transferred by the address bus ABL, and outputs this to the internal data bus. Also, the multiplexer circuit 14 to which the WE1 has been inputted selects the data 1H transferred by the address bus ABH, and outputs this to the internal data bus. As a result, 16-bit data (1H/1L) in which the highest-order 8 bits are 1H and the lowest-order 8 bits are 1L is outputted to the internal data bus. The PC card 1 fetches and processes the 16-bit data of (1H/1L) outputted to the internal data bus.

The personal computer switches the WE signal from Low to High. As in the foregoing embodiment, the data latch circuits 11, 12 latch input data at the timing of the rise from Low to High of the WE signal. Therefore, the latch circuit 11 latches the 8-bit data 2L, while the latch circuit 12 latches the 8-bit data 2H.

A specified time elapse after switching the WE1 from Low to High, the counter 15 outputs a WE2 signal. The multiplexer circuit 13 to which the WE2 has been inputted selects the data inputted from the data latch circuit 11, and outputs this to the internal data bus. The data latch circuit 11 is outputting the data 2L latched at the preceding rise of the WE signal. Also, the multiplexer circuit 14 to which the WE2 has been inputted selects the data inputted from the data latch circuit 12, and outputs this to the internal data bus. The data latch circuit 12 is outputting the data 2H latched at the preceding rise of the WE signal. As a result, 16-bit data (2H/2L) in which the highest-order 8 bits are 2H and the lowest-order 8 bits are 2L is outputted to the internal data bus. The PC card 1 fetches and processes the 16-bit data (2H/2L) outputted to the internal data bus. Further, the WE2 signal is inputted also to the data latch circuits 11, 12. Like the WE1 signal, the WE2 signal is again switched to High a specified time elapse after switched to Low. When this occurs, the counter 15 resets the count value to 0. Also, the data latch circuits 11, 12 release the data latch at the rise of this WE2 signal, thus completing the transfer process of 32-bit data. The aforementioned mapping and following processes are iterated, by which large-volume data is transferred.

In addition, this embodiment also has adopted the block transfer mode in which data is transferred after the setting of the leading address at which data to be transferred from the transfer source to the transfer destination should be stored, and of the amount of data to be transferred. Therefore, during the data transfer cycle, there will never occur problems even if the transfer destination address is not transferred by the address bus.

As described above, in this embodiment, 32-bit data is transferred always by 1-cycle transfer process, making it possible to obtain a transfer rate two times higher than the conventional transfer rate. Thus, by adopting this data transfer method, the time required for data transfer can be reduced and so more efficient processing can be implemented.

As described hereinabove, according to the present invention, an address is specified by a part of transfer data, and the rest of the transfer data has been written in a memory area of the specified address. After that the data in the memory area corresponding to the address is transferred to the transfer destination in the block transfer mode. Therefore, in the block transfer mode, the part of the transfer data is transferred by the address bus, thus allowing the data transfer time to be greatly reduced.

The present invention is useful for data transfer with PC cards or other external connectable equipment which are connected to a personal computer when used.

What is claimed is:

1. A data transfer method comprising:
    a first step for, setting a part of transfer data to be transferred as address data and writing the rest of the transfer data to a memory area specified by the address data in a memory-to-memory data transfer mode; and
    a second step for transferring the data of the memory area to a transfer destination in a block transfer mode.

2. A data transfer program storage medium which has stored a program including the first step and the second step as claimed in claim 1.

3. Information processing equipment to which the data transfer method as claimed in claim 1 is applied, wherein length of data which is carried on a data bus is longer than length of data which is carried on an address bus in the block transfer mode.

4. A card-shaped medium which includes an insertion part into a slot provided in information processing equipment, and which serves as the transfer destination in the data transfer method as claimed in claim 1.

5. The card-shaped medium as claimed in claim 4, wherein length of data which is carried on a data bus is longer than length of data which is carried on an address bus.

6. External equipment with use of the data transfer method claimed in claim 1 comprising:
    an address bus terminal, a data bus terminal, and a multiplexer for selectively fetching data on an address bus inputted at the address bus terminal or data on a data bus inputted at the data bus terminal during the block transfer mode, and outputting the selected data onto an internal data bus.

7. The external equipment as claimed in claim 6, wherein each of the address bus terminal and the data bus terminal comprises a terminal which can be inserted into a slot provided in information processing equipment, and wherein the external equipment has a card shape as a whole.

8. A system for data transfer comprising:
    a first device to receive and send data;
    a second device to interface with the first device, wherein transfer data may be transferred between the first and the second device in a two step process, wherein
        during the first step, data representing a starting address location in a storage area is stored in a first part of the transfer data; and wherein
        during the second step, the transfer data is transferred in a block transfer mode to the address location, wherein the address data located in the first part of the transfer data represents the starting address of the address location in which the transfer data is to be stored, and all of the other transfer data is to be stored in consecutive addresses in the address location, beginning with the starting address location.

* * * * *